(12) United States Patent
Staudinger et al.

(10) Patent No.: US 7,740,119 B2
(45) Date of Patent: Jun. 22, 2010

(54) HYDRAULIC CONTROL FOR A DUAL CLUTCH TRANSMISSION

(75) Inventors: Martin Staudinger, Ettlingen (DE); Marco Grethel, Buehlertal (DE)

(73) Assignee: Luk Lamellen und Kupplungsbau Beteiligungs KG, Buehl (DE)

( * ) Notice: Subject to any disclaimer, the term of this patent is extended or adjusted under 35 U.S.C. 154(b) by 0 days.

(21) Appl. No.: 12/432,204

(22) Filed: Apr. 29, 2009

(65) Prior Publication Data

US 2009/0211866 A1    Aug. 27, 2009

Related U.S. Application Data

(63) Continuation of application No. PCT/DE2007/001756, filed on Sep. 28, 2007.

(30) Foreign Application Priority Data

| Oct. 30, 2006 | (DE) | ......................... 10 2006 051 704 |
| Dec. 27, 2006 | (DE) | ......................... 10 2006 061 540 |
| Jan. 20, 2007 | (DE) | ......................... 10 2007 003 050 |

(51) Int. Cl.
*F16D 25/10* (2006.01)
*F16D 13/72* (2006.01)

(52) U.S. Cl. .................. 192/48.609; 192/70.12; 192/113.34

(58) Field of Classification Search .................. None
See application file for complete search history.

(56) References Cited

U.S. PATENT DOCUMENTS

| 3,589,483 | A |   | 6/1971 | Smith |
| 3,760,918 | A | * | 9/1973 | Wetrich et al. ............ 192/87.11 |
| 6,715,597 | B1 |   | 4/2004 | Buchanan et al. |
| 7,207,922 | B2 | * | 4/2007 | Kuhstrebe et al. ............. 477/97 |
| 7,401,689 | B2 | * | 7/2008 | Hegerath et al. ........... 192/3.58 |
| 2007/0062773 | A1 | * | 3/2007 | Moehlmann et al. ....... 192/3.58 |

FOREIGN PATENT DOCUMENTS

DE    101 28 856 A    5/2002

* cited by examiner

*Primary Examiner*—Richard M. Lorence
(74) *Attorney, Agent, or Firm*—Lucas & Mercanti, LLP

(57) ABSTRACT

A double clutch gearbox, which has a first volume flow valve for actuating a first clutch, which is arranged downstream, a second volume flow valve for actuating a second clutch which is arranged downstream, and a first hydraulic power source for supplying the volume flow valves and the clutches with a system pressure. In order to provide an improved double clutch gearbox, the clutches have fluid cooling which is arranged downstream of the first volume flow valve.

8 Claims, 3 Drawing Sheets

HYDRAULIC CONTROL FOR A DUAL CLUTCH TRANSMISSION

The present invention relates to a dual clutch transmission, with a first volume flow valve for activating a following first clutch, a second volume flow valve for activating a following second clutch, and a first hydraulic energy source for supplying the volume flow valves and the clutches with a system pressure.

Dual clutch transmissions of the type initially mentioned are known. They may be provided, for example, in a drive train of a motor vehicle having an internal combustion engine. Furthermore, it is possible to provide such dual clutch transmissions in a drive train of motor vehicles having a hybrid drive.

The object of the invention is to provide an improved dual clutch transmission, in particular for use in motor vehicles having a hybrid drive, in particular with a fluid cooling of simpler construction.

The object is achieved by means of a dual clutch transmission, with a first volume flow valve for activating a following first clutch, a second volume flow valve for activating a following second clutch, and a first hydraulic energy source for supplying the volume flow valves and the clutches with a system pressure, in that the clutches have a fluid cooling which follows the first volume flow valve. Via the first volume flow valve, the fluid cooling can be supplied, by means of the preceding first hydraulic energy source, with hydraulic energy or with a corresponding hydraulic medium for cooling the clutches.

A preferred exemplary embodiment of the dual clutch transmission is characterized in that the first hydraulic energy source is followed by a pressure accumulator, in a first switching position of the first volume flow valve the hydraulic energy source being connected only to the pressure accumulator, the latter being capable of being acted upon with the system pressure. In this first switching position, advantageously, the pressure accumulator can be filled for storage with the hydraulic energy at the comparatively high pressure level of the system pressure.

A further preferred exemplary embodiment of the dual clutch transmission is characterized in that, in a second switching position of the first volume flow valve, the hydraulic energy source is connected to the fluid cooling, for cooling the clutches the fluid cooling being capable of being supplied with a comparatively low cooling pressure by means of the hydraulic energy source. The hydraulic energy source may have an electric motor and a correspondingly assigned pump for conveying the hydraulic medium. The wave power necessary for conveying the hydraulic medium is dependent on the volume flow to be conveyed and on the pressure difference to be overcome in the process. Advantageously, because of the comparatively low cooling pressure, the wave power is likewise relatively low, so that, with the wave power being relatively low, a sufficient volume flow for cooling the clutches can be generated. The cooling pressure may also be designated as cooling medium pressure, in particular cooling oil pressure, and, for example, during the straightforward cooling operation, amounts to only one bar. The electric motor may advantageously be of comparatively small design. For conveying the comparatively high system pressure, this arrangement of relatively small design, consisting of the electric motor and of the pump, may likewise be used, since only relatively low volume flows and/or short switch-on times are necessary, particularly because of the use of the pressure accumulator.

A further preferred exemplary embodiment of the dual clutch transmission is characterized in that, in a third switching position of the first volume flow valve, the first clutch is connected to the hydraulic energy source and to the pressure accumulator and can be supplied with the system pressure by means of the hydraulic energy source and/or by means of the pressure accumulator. In the third switching position, therefore, the volume flow valve serves for activating the first clutch. As soon as the latter is acted upon with the system pressure by means of the first volume flow valve in the third switching position, the clutch can close.

A further preferred exemplary embodiment of the dual clutch transmission is characterized in that, in the first and in the second switching position of the first volume flow valve, the first clutch is switched pressurelessly and is connected to a tank. In the first and the second switching position too, the volume flow valve can be used for activating the first clutch, the first clutch being capable of opening or being open in the first and the second switching position.

A further preferred exemplary embodiment of the dual clutch transmission is characterized in that the fluid cooling follows a second hydraulic energy source which is driven by an internal combustion engine. The dual clutch transmission may follow an internal combustion engine for the shifting of gears. Advantageously, the internal combustion engine can drive the second hydraulic energy source or a pump of the second hydraulic energy source. It is advantageously possible to use this second hydraulic energy source for conveying the cooling oil volume flow for the clutches. Advantageously, with the internal combustion engine switched off, for example when the dual clutch transmission is used in a motor vehicle having a hybrid drive, the first hydraulic energy source can be used for cooling the clutches. For this purpose, the first volume flow valve can be brought into the second switching position.

A further preferred exemplary embodiment of the dual clutch transmission is characterized in that the first hydraulic energy source is driven by an electric motor. Advantageously, even with the internal combustion engine at a standstill, the electric motor can drive the pump of the first hydraulic energy source for the conveyance of the hydraulic medium.

A further preferred exemplary embodiment of the dual clutch transmission is characterized in that the fluid cooling can be supplied by means of the first hydraulic energy source even when the internal combustion engine is at a standstill. This advantageously ensures that the clutches of the dual clutch transmission can also be cooled in the various operating states, that is to say, for example, with the internal combustion engine switched off and with the hybrid electric motor switched on.

The object is also achieved by the use of a dual clutch transmission as described above in a motor vehicle having a hybrid drive.

Furthermore, the object is achieved by means of a hydraulic system having a feature or a feature combination, as described above.

Further advantages, features and particulars of the invention may be gathered from the following description which describes an exemplary embodiment in detail with reference to the drawing. Identical, similar and/or functionally identical parts are given the same reference symbols. In the drawing.

Figure 1:
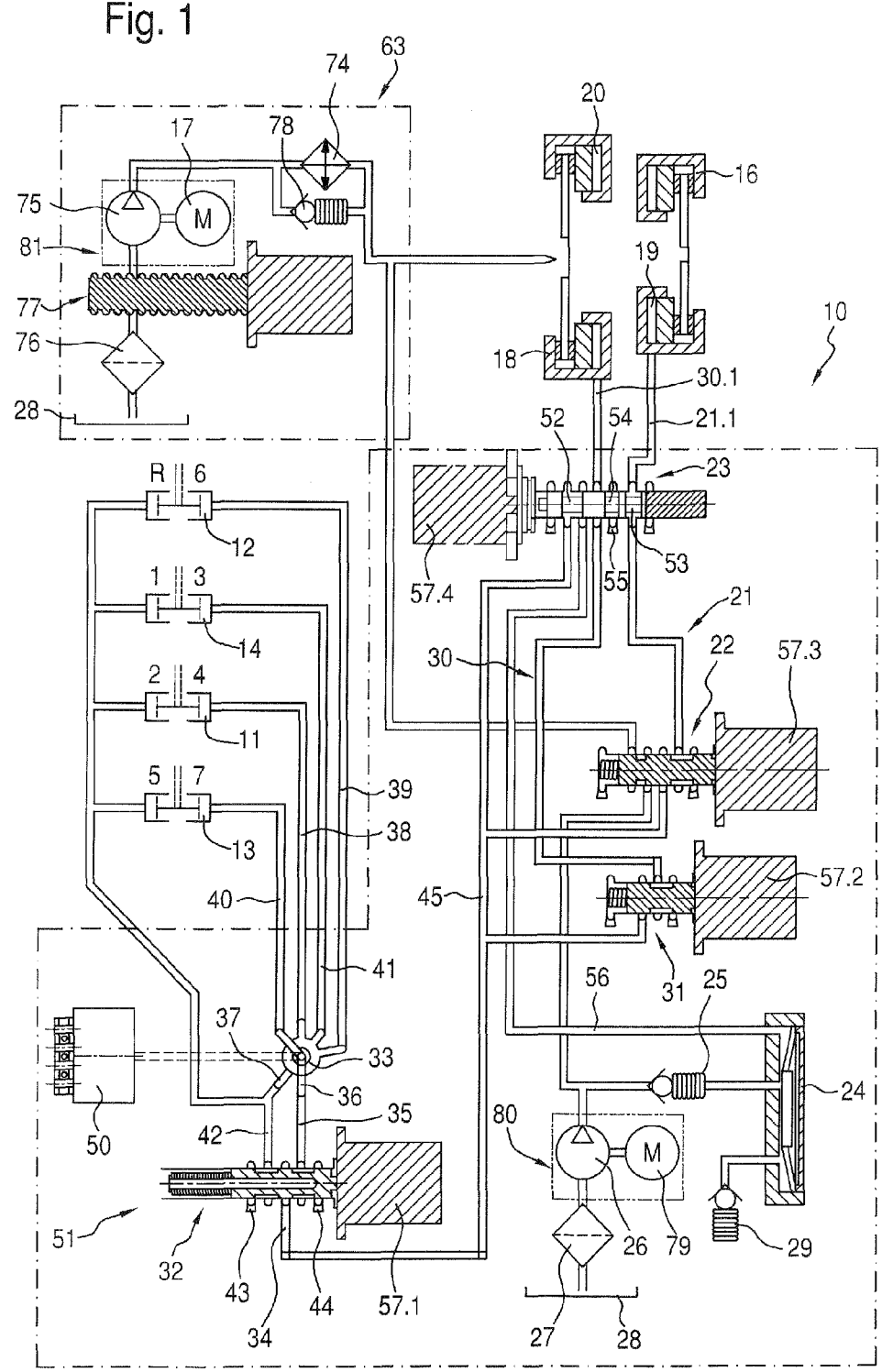
FIG. 1 shows a schematic illustration of a dual clutch transmission according to the invention.

FIG. 1 shows an exemplary embodiment of a dual clutch transmission 10 according to the invention, which is illustrated only schematically here. The present exemplary embodiment is based on an 8-gear transmission with seven forward gears and with one reverse gear. The individual gears are shifted by shift cylinders 11, 12, 13 and 14. Basically, it is possible to provide more or fewer shift cylinders. In the present exemplary embodiment, the shift cylinder 11 shifts gears two and four, the shift cylinder 12 shifts reverse gear and gear six, the shift cylinder 13 shifts gears five and seven and the shift cylinder 14 shifts gears one and three. The shift cylinders are in each case actuated hydraulically and possess two end positions which in each case correspond to one of the two gears, and also a middle position in which neither of the two gears is selected. Gears two, three, five and seven, consequently all the uneven gears, can cooperate with a first transmission input shaft, not illustrated, which can be engaged and disengaged with the crankshaft of an internal combustion engine 17 by means of a first hydraulically actuated clutch 16 (hydraulic clutch). Correspondingly, gears two, four and six and reverse gear can cooperate with a second transmission input shaft, likewise not illustrated, which can be engaged and disengaged with the crankshaft of the internal combustion engine 17 by means of a second hydraulically actuated clutch 18. The clutches 16 and 18 are illustrated merely schematically here and are hydraulically actuated wet clutches of the type which are opened in the pressureless state. It is also conceivable to design the clutches such that they are closed in the pressureless state. For this purpose, the first clutch 16 is actuated by a first hydraulic cylinder 19 and the second clutch 18 is actuated by a second hydraulic cylinder 20. The first hydraulic cylinder 19 is connected to a first volume flow valve 22 via a hydraulic line 21. The first volume flow valve 22 is connected to a pressure accumulator 24 via a safety valve block 23, which comprises a plurality of valves explained further below, and via a pressure accumulator line 56. The pressure accumulator 24 is connected to a tank 28 via a nonreturn valve 25, a pump 26 and an oil filter 27. The pump 26 conveys hydraulic oil out of the tank 28 via the oil filter 27 into the pressure accumulator 24. Furthermore, in the vicinity of the pressure accumulator 24, a pressure relief valve 29 is arranged which limits the maximum pressure in the pressure accumulator 24 and in the following components. The pressure accumulator 24, the nonreturn valve 25, pump 26, oil filter 27, tank 28 and pressure relief valve 29 are parts of a pressure apparatus.

The second hydraulic cylinder 20 is connected to a second volume flow valve 31 via a hydraulic line 30.

To regulate a shift pressure for selecting the gears by means of the shift cylinders 11 to 14, a shift-pressure regulating valve 32 with an inlet 34 is provided. An outlet 35 of the shift-pressure regulating valve 32 is connected to a rotary slide valve 33 as a changeover valve. The rotary slide valve 33 has an inlet 36 which can be connected hydraulically to outlets 38, 39, 40 and 41. The rotary slide valve 33 has, in addition to the first inlet 36, a second inlet 37, all the outlets 38, 39, 40 or 41 which are not connected to the inlet 36 each being connected to the second inlet 37. There is therefore always exactly one outlet 38 or 39 or 40 or 41 connected to the inlet 36, all the other outlets being connected to the second inlet 37. The rotary slide valve 33 is actuated by an electric stepping motor 50. The rotary slide valve 33 and the shift-pressure regulating valve 32 are designated together as a shift valve arrangement 51. In the illustration of FIG. 1, the outlet 38 is connected to the shift cylinder 11 on the side which serves for shifting the second gear. The outlet 39 is connected to the shift cylinder 12 on the side which serves for shifting the reverse gear. The outlet 40 is connected to the shift cylinder 13 on the side which serves for shifting the fifth gear, and the outlet 41 is connected to the shift cylinder 14 on the side which serves for shifting the first gear. The respective other sides of the shift cylinders 11, 12, 13 and 14 are connected jointly to an outlet 42 of the shift-pressure regulating valve 32. This shift-pressure regulating valve 32 has three switching positions, in the first switching position the inlet 34 being connected to the outlet 35 and at the same time the outlet 42 being connected via a first return line 43 to the tank 28. In the second valve position, the inlet 34 is connected to the outlet 42, while at the same time the outlet 35 is connected via a return line 44 to the tank 28. The outlets 35 and 42 are therefore acted upon alternatively with pressure, the respective other outlet being made pressureless. The third switching position is exactly between the first and the second. Here, both the outlet 35 and the outlet 42 are connected to the tank via the ducts 43 and 44, thus ensuring that no pressure enters the shift cylinders. What are designated here as the first pressure p1 and the second pressure p2 are the (high) pressure in the case of connection to the pressure accumulator 24 or the delivery side of the pump 26 and the (low) pressure in the case of connection to the tank 28 or to the suction side of the pump 26.

The safety valve block 23 comprises a first safety valve 52 in order to close or open (interrupt) the connection of a supply line 45 to the pressure accumulator line 56. With the first safety valve 52 open, the volume flow valves 22, 31 and the shift-pressure regulating valve 32 are decoupled from the pressure accumulator 24 or the pump 26. The safety valve block 23 comprises, further, a second safety valve 53, by means of which a line part 21.1 and the line part 21 are connected via a return line 55 to the tank 28. The safety valve block 23 comprises, further, a third safety valve 54, by means of which a line part 30.1 and the line part 30 are connected via a return line 55 to the tank 28. The safety valve block 23 has an operating position in which the first volume flow valve 22, the second volume flow valve 31 and the shift-pressure regulating valve 32 are connected to the pressure accumulator 24. In this position, the hydraulic lines 21 and 30 are also switched to be pressure-tight. In the other position, the emergency position, the hydraulic lines 21 and 30 are switched to tank, and the connection of the first volume flow valve 22, of the second volume flow valve 31 and of the shift-pressure regulating valve 32 to the pressure accumulator is in this case interrupted. The first and the second volume flow valve 22, 31 make it possible to act with pressure upon the respectively assigned hydraulic line 21 or 30, in that a connection is made with the supply line 45 which is connected to the pressure accumulator 24 via the safety valve block 23.

The volume flow valves 22 and 31 can be opened in any desired (intermediate) position, that is to say they are proportional servo valves which can control a volume flow. The two volume flow valves 22, 31 have a position in which the hydraulic lines 21 and 30 are connected directly to the tank 28, so that the respectively assigned hydraulic cylinder 19, 20 is completely pressureless.

The volume flow of the pump 26 and pressure accumulator 24 arrives directly at the safety valve block 23 and is routed from here further on to the two volume flow valves 22, 31 and the shift-pressure regulating valve 32. In the event of a switching of the safety valve block 23, all the system components are separated from the pressure supply, but the filling of the pressure accumulator 24 is maintained. The activation of the first hydraulic cylinder 19 and of the second hydraulic cylinder 20 is implemented by means of the volume flow valves 22, 31.

Between the volume flow valves 22, 31 and the hydraulic cylinders 19, 20, the hydraulic oil is conducted once again through the safety valve block 23, specifically in such a way that, when the safety valve block 23 is actuated, the residual pressures of the hydraulic cylinders 19, 20 are conducted directly from the safety valve block 23 into the tank 28. The safety valve block 23 consequently fulfills three functions, it closes the accumulator 24, so that a high volume flow does not have to be discharged into the tank 28, it applies the system and residual pressures possibly contained in the latter directly to the tank 28, and it empties the two hydraulic cylinders 19, 20 directly into the tank 28. The activation of the shift cylinders takes place with the aid of the shift-pressure regulating valve 32 and the rotary slide valve 33 which is actuated by the stepping motor 50.

When the shift-pressure regulating valve 32 is switched to the tank 28, seven cylinders are switched to the tank and one cylinder is acted upon with pressure. This will then move correspondingly. In FIG. 1, for example, the outlet 40 is acted upon with pressure, so that this will move correspondingly such that gear five is engaged. When the shift-pressure regulating valve 32 is changed over, the seven cylinders are under pressure and the eighth is applied to the tank 28 and therefore shifts in this direction. This means, in the position of the rotary slide valve 33, as shown in FIG. 1, a disengagement of gear five and a engagement of gear seven. The changeover of the shift-pressure regulating valve 32 means that the outlet 41 of the shift-pressure regulating valve is connected to the pressure accumulator 24 and the outlet 35 is connected to the tank 28.

The safety valve arrangement 23, the volume flow valves 22 and 31 and the shift-pressure regulating valve 32 are actuated by means of electrical actuators 57.1, 57.2, 57.3 or 57.4, respectively. The system illustrated in FIG. 1 may be operated without pressure sensors. This is possible since the positions of the shift forks and the state of the clutches are detected by means of displacement sensors, not illustrated here. Sufficient information for valve regulation can therefore be given to control electronics by the displacement signal. A system pressure sensor may be replaced by a more cost-effective displacement sensor on the pressure accumulator. Since the pressure accumulator functions on the principle of a cup spring, the position of the cup spring can be recorded, for example, by means of a Hall sensor, and therefore the switch-on and switch-off points of the pump can be determined. Should this no longer be ensured due to a sensor defect or a mistake of the electronic control, the pressure accumulator is protected against overload by the pressure relief valve 29 (pressure limiting valve).

Figure 2:
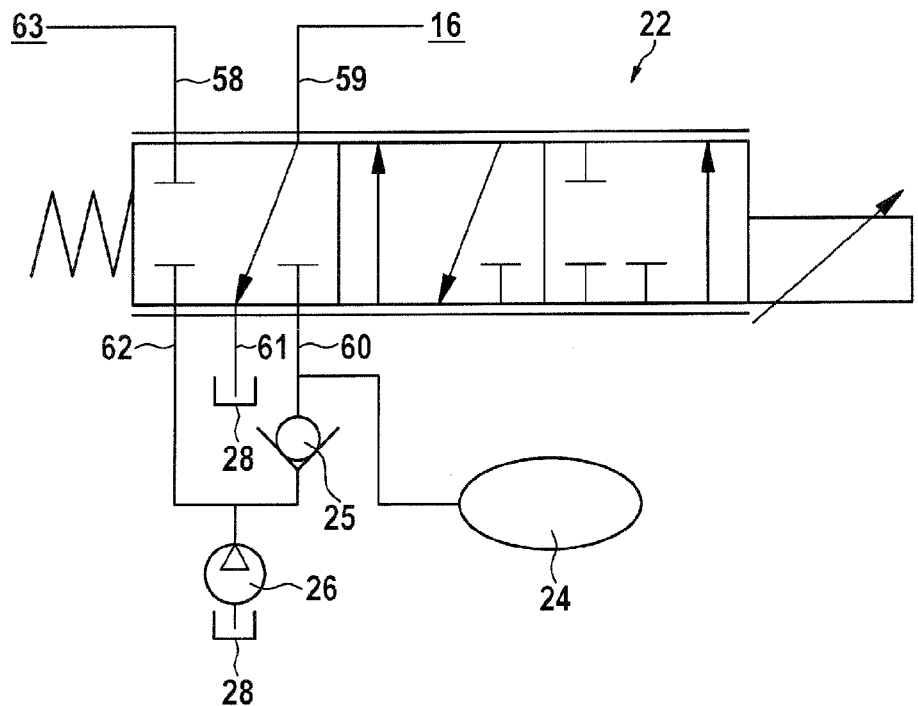
FIG. 2 shows a circuit diagram of a first volume flow valve of the dual clutch transmission.
Figure 3:
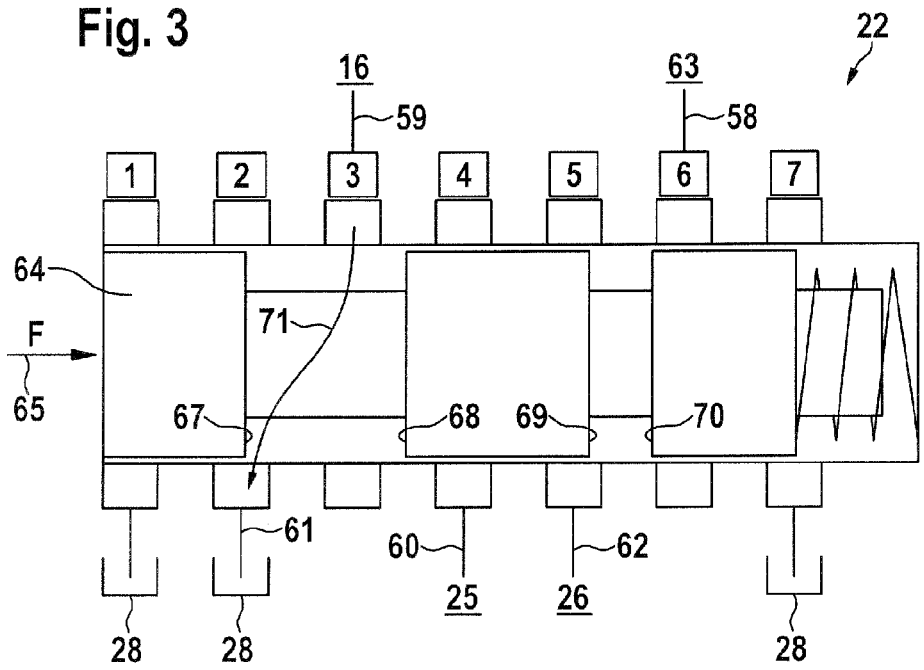
FIG. 3 shows a diagrammatic sectional view of the first volume flow valve symbolized in FIG. 2, in a first switching position.
Figure 4:
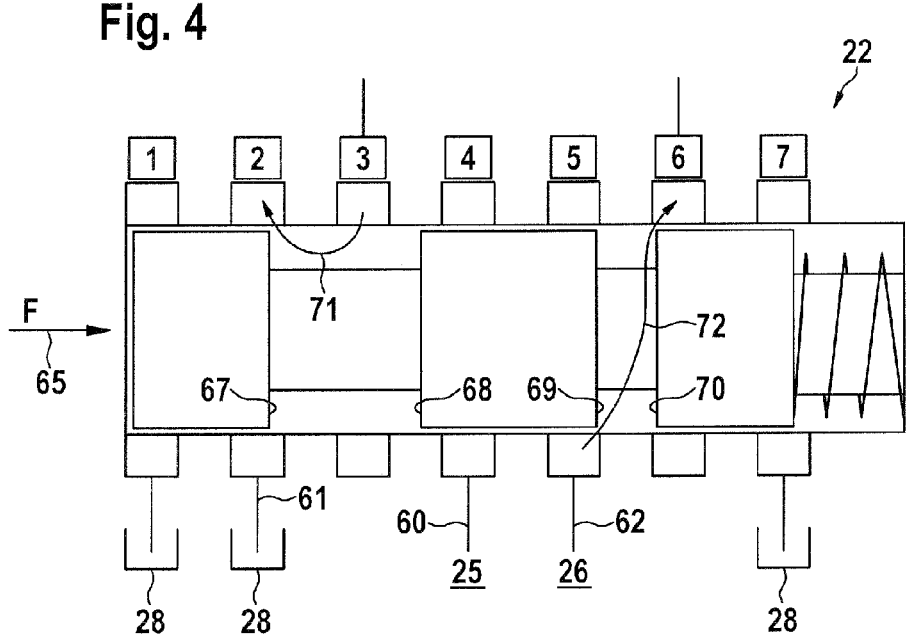
FIG. 4 shows the first volume flow valve shown in FIG. 3, in a second switching position.
Figure 5:
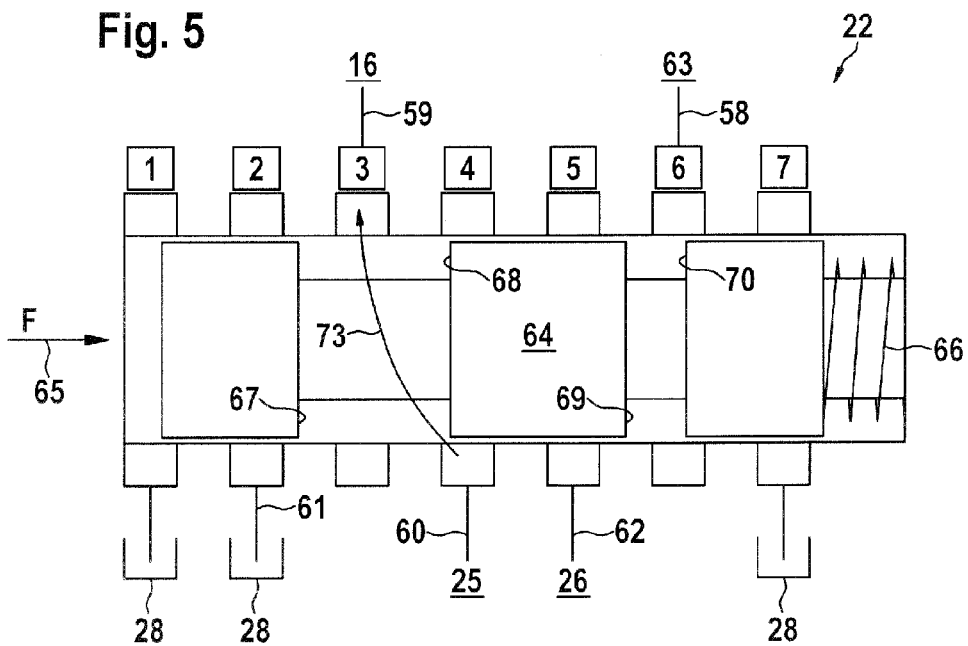
FIG. 5 shows the first volume flow valve shown in FIGS. 3 and 4, in a third switching position.

FIG. 2 shows a circuit diagram of the first volume flow valve 22 designed as a five/three-way valve. FIGS. 3 to 5 show a schematic sectional view of the second volume flow valve 22 and a first, a second and a third switching position.

As can be seen in FIG. 2, the first volume flow valve 22 has five connections, a first connection 58 leading to a fluid cooling 63 illustrated in FIG. 1. A second connection 59 leads to the first clutch 16. A third connection 60 leads to the nonreturn valve 25 and to the pressure accumulator 24. In contrast to the illustration according to FIG. 1, the safety valve between the volume flow valve and the pressure supply unit, consisting of the nonreturn valve 25, pump 26 and pressure accumulator 24, is not illustrated. A fourth connection 61 of the first volume flow valve 22 leads to the tank 28. A fifth connection 62 leads directly to the pump 26. FIG. 2 shows the first volume flow valve 22 in a first switching position which corresponds to the switching position according to FIG. 3. The functioning of the first volume flow valve 22 is explained in more detail below with reference to FIGS. 3 to 5. The first volume flow valve 22 has overall seven ports 1 to 7, a control piston 64, magnetic actuation 57.4, which is indicated by an arrow 65, and a restoring spring 66 which applies a counterforce and which counteracts a magnetic force according to the arrow 65 on the control piston 64. The actuating piston 64 has a first control flank 67, a second control flank 68, a third control flank 69 and a fourth control flank 70.

The ports 1 and 7 have only minor importance for the actual switching function of the first volume flow valve 22. The port 2 corresponds to the connection 61, the lamella 3 to the connection 59, the lamella 4 to the connection 60, the lamella 5 to the connection 62 and the lamella 6 to the connection 58.

In FIG. 3, a curved arrow 71 indicates that, in the first switching position, the port 3 and the port 2 are fluidically connected to one another, so that the hydraulic medium can flow from the first clutch 16 back into the tank 28, that is to say the first clutch 16 is switched pressurelessly. The ports 4, 5 and 6 are each blocked by the control piston 64.

In the illustration according to FIG. 4, the first arrow 71 indicates that, in the second switching position, too, the ports 2 and 3 are fluidically connected to one another. In the illustration according to FIG. 4, the control piston 64 is adjusted to the right by the magnetic force, so that the fourth control flank 70 of the control piston 64 releases the port 6. Moreover, in this case, the third control flank 69 is still set so that it still releases the port 5. The ports 5 and 6 are therefore fluidically connected to one another, this being indicated by a second curved arrow 72 in FIG. 4, In a second switching position, as illustrated in FIG. 4, therefore, the fluid cooling 63 can be supplied with the hydraulic medium at the low pressure level via the ports 5 and 6. Moreover, in this switching position, the first clutch 16 is still switched pressurelessly.

In the third switching position, as is clear in FIG. 5, the control piston 64 is adjusted even further to the right, as seen in the orientation of FIG. 5. In this case, the first control flank 67 moves so far to the right that it shuts off the port 2. Moreover, the second control flank 68 of the control piston 64 is likewise moved so far to the right that the port 4 is released. Furthermore, the ports 5 and 6 are blocked by the control flanks 69 and 70. A third curved arrow 73 indicates that, in this third switching position, the first clutch 16 or its first hydraulic cylinder 19 is acted upon with the system pressure conveyed in the pressure accumulator 24 and/or by the pump 26. For this purpose, the ports 3 and 4 are fluidically connected to one another.

It is clear in FIG. 1 that the dual clutch transmission 10 has the fluid cooling 63, as symbolized by a rectangle. The fluid cooling 63 has a pump 75 for conveying a cooling medium, for example the hydraulic medium. For this purpose, the pump 75 follows the tank via a suction filter 76. An electromagnetically actuated valve 77 is inserted between the pump 75 and the suction filter 76.

The pump 75 is followed by a cooler 74 and a nonreturn valve 78 connected in parallel to the latter. In the case of a comparatively high-viscosity cooling medium, that is to say in the event that no cooling is required, the higher viscosity gives rise to a higher pressure, so that the nonreturn valve 78 opens automatically, that is to say comparatively little medium is routed through the cooler. If the cooling medium is comparatively liquid, the pressure is relatively low, so that the nonreturn valve 78 can remain closed, that is to say the entire cooling medium is routed through the cooler 74. The cooler 74 and the nonreturn valve 78 are followed by the two clutches 16 and 18 or by the cooling ducts, not illustrated in any more detail, of the two clutches 16 and 18.

Furthermore, it is clear in FIG. 1 that the pressure apparatus has an electric motor 79 assigned to the pump 26. The pump 26 and the assigned electric motor form a first hydraulic energy source 80. The internal combustion engine 17 and the assigned pump 75 form a second hydraulic energy source 81.

In order to ensure the cooling of the clutches 16 and 18 when the internal combustion engine 17 is at a standstill, the separate pump 26 having the electric motor 79 can be used. If the control of the transmission 10 is implemented by means of a power pack, there is the possibility of using the pump 26 and the electric motor 79 of the power pack for cooling when the accumulator 24 of the power pack is full and the pump 26 is therefore not used.

The motor 79 of the power pack may be designed such that it covers the nominal wave power only briefly for the duration of the storage filling of the accumulator 24. If, however, the intention is also to use this motor for cooling the clutches, then it is necessary to operate it in a continuous operating mode.

In order in this case not to overload the motor 79, it is advantageously possible to bring the pump 26 to the system pressure level during storage filling only and to convey only approximately 1 bar during straightforward cooling operation. The wave power required for this purpose is so low that the motor 79 withstands the load. A way has been found not to operate the cooling from the control system, but, instead, to tap the cooling oil demand directly downstream of the pump 79, also upstream of the main system pressure, via the first volume flow valve 22.

The latter advantageously ensures this changeover. In order to implement this valve function with as few additional parts as possible, the cooling changeover function is to be connected to the first volume flow valve 22.

A way has thus been found to design the first volume flow valve 22 in such a way that, with only low valve actuation, first, the pump 26 is connected directly to the clutch cooling. With a further application of current, this connection closes again, and the first clutch 16 is actuated normally. This is therefore a 5/3-way valve.

It is thus possible to implement the cooling function of the clutches 16 and 18 without an additional valve, with only two ports more on the first volume flow valve 22.

Port 4 is the connection of the first volume flow valve 22 to the system pressure of the control. port 3 is the inflow to the clutch piston 19. Port 5 is connected directly to the pump 26 and the accumulator 24, and port 6 goes to the clutch cooling.

The motor 79 of the hydraulic control therefore additionally assumes clutch cooling while the cooling oil pump 75 is stationary because the internal combustion engine 17 is switched off. The control of this additional function is assumed by one of the clutch valves, here the first volume flow valve 22, by means of an added switching position.

LIST OF REFERENCE SYMBOLS

10 Dual clutch transmission
11 Shift cylinder
12 Shift cylinder
13 Shift cylinder
14 Shift cylinder
16 First clutch
17 Internal combustion engine
18 Second clutch
19 First hydraulic cylinder
20 Second hydraulic cylinder
21 Hydraulic line
22 First volume flow valve
23 Safety valve block
24 Pressure accumulator
25 Nonreturn valve
26 Pump
27 Oil filter
28 Tank
29 Pressure relief valve
30 Hydraulic line
31 Second volume flow valve
32 Shift-pressure regulating valve
33 Rotary slide valve
34 Inlet
35 Outlet
36 First inlet of the rotary slide valve 33
37 Second inlet of the rotary slide valve 33
38 Outlet
39 Outlet
40 Outlet
41 Outlet
42 Outlet
43 First return line
44 Second return line
45 Supply line
46
47
48
49
50 Stepping motor
51 Shift valve arrangement
52 First safety valve
53 Second safety valve
54 Third safety valve
55 Supply line to the tank 28
56 Pressure accumulator line
57.1, 57.2,
57.3, 57.4 Actuators
58 First connection
59 Second connection
60 Third connection
61 Fourth connection
62 Fifth connection
63 Fluid cooling
64 Control piston
65 Arrow
66 Restoring spring
67 First control flank
68 Second control flank
69 Third control flank
70 Fourth control flank
71 Arrow
72 Arrow
73 Arrow
74 Cooler
75 Pump
76 Suction filter
77 Shut-off valve
78 Nonreturn valve
79 Electric motor
80 First hydraulic energy source
81 Second hydraulic energy source

The invention claimed is:

1. A dual clutch transmission, comprising:
   a first volume flow valve for activating a first clutch, the first clutch being located downstream of the first volume flow valve;
   a second volume flow valve for activating a second clutch, the second clutch being located downstream of the second volume flow valve;
   a first hydraulic energy source for supplying the first volume flow valve and the second volume flow valve and the first clutch and the second clutch with a system pressure; and
   a fluid cooling unit in fluid communication with the first clutch and the second clutch, the fluid cooling unit located downstream of the first volume flow valve,
   wherein, the first volume flow valve has a first switching position and a second switching position, in the second switching position, the first hydraulic energy source is connected to the fluid cooling unit, for cooling the first clutch and the second clutch, the fluid cooling unit being capable of being supplied with a comparatively low cooling pressure by means of the first hydraulic energy source.

2. The dual clutch transmission as claimed in claim 1, wherein the first hydraulic energy source is upstream of a pressure accumulator, and in the first switching position of the first volume flow valves the first hydraulic energy source is connected only to the pressure accumulator, the pressure accumulator being capable of being acted upon with the system pressure.

3. The dual clutch transmission as claimed in claim 1, wherein, in a third switching position of the first volume flow valve, the first clutch is connected to the first hydraulic energy source and to a pressure accumulator and can be supplied with the system pressure by means of the first hydraulic energy source and/or by means of the pressure accumulator.

4. The dual clutch transmission as claimed in claim 1, wherein, in the first switching position and the second switching position of the first volume flow valve, the first clutch is switched without pressure and is connected to a tank.

5. The dual clutch transmission as claimed in claim 1, wherein the fluid cooling unit is located downstream of a second hydraulic energy source which is driven by an internal combustion engine.

6. The dual clutch transmission as claimed in claim 1, wherein the first hydraulic energy source is driven by an electric motor.

7. The dual clutch transmission as claimed in claim 1, wherein the fluid cooling unit can be supplied by means of the first hydraulic energy source even when an internal combustion engine is at a standstill.

8. A motor vehicle having a hybrid drive including the dual clutch transmission as claimed in claim 1.

* * * * *